March 31, 1936. J. S. DONALDSON Re. 19,904

PISTON

Original Filed Aug. 24, 1932 2 Sheets-Sheet 1

INVENTOR
John Sherman Donaldson
BY Arthur H. Kent
his ATTORNEY

March 31, 1936. J. S. DONALDSON Re. 19,904

PISTON

Original Filed Aug. 24, 1932 2 Sheets-Sheet 2

INVENTOR
John Sherman Donaldson
BY
Arthur A. Kent
his ATTORNEY

Reissued Mar. 31, 1936 Re. 19,904

UNITED STATES PATENT OFFICE 19,904

PISTON

John Shearman Donaldson, St. Albans, N. Y., assignor to Donaldson Piston Corporation, Belleville, N. J., a corporation of New Jersey Original No. 1,904,126, dated April 18, 1933, Serial No. 630,215, August 24, 1932. Application for reissue April 16, 1935, Serial No. 16,659

11 Claims. (Cl. 309—20)

This invention relates to pistons, and more particularly to pistons for internal combustion engines.

In the construction and operation of internal combustion engines, one of the principal factors to be taken into consideration is the differential expansion and contraction of the cylinder and piston under the varying temperatures which they assume and which extend over a large range in the normal or usual operation of the engine. Generally the cylinder is water-jacketed and air-cooled. The piston, owing to its location and movement, is neither water-cooled nor controlled as to temperature by a forced circulation of air. According to prevailing practices, the cylinder blocks of internal combustion engines are of cast iron, whereas the pistons are of light aluminum alloy having a higher coefficient of heat expansion than the metal of the cylinder blocks. By reason of these differences in the cooling of the cylinder and the piston, and also because of the different metals of which they are made, a serious problem of compensation for differential expansion and contraction is presented. The piston should have a reasonably close fit with the cylinder throughout the temperature range. The difficulty to be overcome is that a suitable fit between the piston and cylinder when the engine is cold has a strong tendency to become a binding fit when the engine is warm, whereas, upon the other hand, if the fit is made suitable under warm engine conditions, the fit becomes too loose under cooler conditions.

To overcome this difficulty, pistons have been made with split skirts. But where a skirt is slotted down one side, the wrist pin bearing of the piston acts as a tie preventing uniform expansion and as a strut in opposition to contraction. This results in the piston taking a shape, when heated, which is non-conformant with the shape of the cylinder and is usually followed by a permanent deformity of the piston in the shape it assumes when hot.

It is one of the objects of the present invention to provide an effective means of controlling the differential expansion of a piston and its cylinder whereby a suitable sliding fit is effected and maintained throughout all of the temperatures of a reasonable operating range.

Another object of the invention is to provide an improved connection between a piston and its connecting rod by which it becomes possible to remove and insert the piston through the top of the cylinder without disconnecting the connecting rod from the crank shaft. According to the present invention, a piston may be quickly and easily removed when it is desired, for example, to renew the rings, and as quickly and easily replaced in position, without disturbing the operative condition of the connections below the piston, as is generally required in prior constructions.

Other objects of the invention are to provide for the equalization of wear on the piston and to provide for adjustments to compensate for wear at the bearing connection between the rod and the piston.

Other objects will be in part obvious and in part pointed out particularly as the description of an embodiment of the invention proceeds.

To the accomplishment of these objects the invention involves a piston divided at its wall into two parts, a head or ring-supporting portion and a skirt portion, the two portions being so related that a minimum of heat will pass from the head portion to the skirt portion.

The head portion, being exposed to the hot gases in the cylinder, is raised to a relatively high temperature. This is not harmful, so far as expansion is concerned, since the head portion (exclusive of its rings) does not have to fit the cylinder closely. The piston is guided and held in alignment by the skirt portion and hence the latter must fit the cylinder reasonably closely at all engine temperatures. For this reason it is necessary to minimize differential expansion and contraction by keeping the skirt portion sufficiently cool to maintain an effective and unbinding seal. This involves controlling the flow of heat from the head portion to the skirt portion by making the body which connects the head and skirt portions long and small in cross-section, and by so constructing and locating the members of such body that they are as much exposed as possible to the cooling action of the oil splashed up from the crank-case and of the circulating air in the latter.

One of the most satisfactory ways of connecting the head and skirt portions is through the medium of a central body having a plurality of downwardly and outwardly extending spaced legs, the upper end of the central body portion merging with the head and the lower ends of the legs merging with the lower part of the skirt portion. The use of spaced legs allows the oil and air to reach all sides of such connecting portions and thereby exert a maximum cooling effect.

The merging of such legs with the lower part of the skirt portion, instead of the middle or upper part thereof, not only extends the distance that the heat has to travel from the central body portion to the skirt portion and increases the area of such legs exposed to the cooling action of the oil and air, but also leads the heat to that part of the skirt which comes in contact with the coolest part of the cylinder walls. The cylinder walls become heated by the hot gases and the parts exposed to such hot gases the longest time have the highest temperature. Hence, the temperature of the cylinder wall surface decreases from the top of the cylinder downward. As the skirt contacts with the cylinder walls, heat passes from the former to the latter, and the cooler any part of the cylinder walls is with respect to the part of the piston skirt in contact therewith the greater the amount of heat which will pass from such part of the skirt to the cylinder walls. The skirt is hottest in the zone which receives heat by conduction from the top of the piston. In the present case, this zone of maximum temperature is adjacent the bottom of the skirt. As this zone of maximum skirt temperature contacts with the coolest zone of the parts of the cylinder walls which contact with the piston skirt, the heat transfer will be a maximum.

The usual wrist-pin type of connection results in unequal wear on the piston and cylinder, the wear taking place principally along two diametrically opposite longitudinal zones of the piston. By providing a ball-and-socket connection between the piston and the connecting rod, and providing means for turning the piston on each cycle through a variable angle, the piston is caused to wear equally around its periphery and the scoring of either the piston or cylinder wall is avoided.

One of the most satisfactory methods of turning the piston is to so shape the latter that it is turned by the natural forces developed in the operation of the engine. This method not only obviates the need of additional moving mechanical parts, but also results in the turning of the piston through a variable angle, thereby avoiding the scoring or grooving which might result if the piston and cylinder walls were periodically brought into the same relative angular position.

The ball-and-socket type of connection between the piston and its connecting rod is admirably adapted for pistons of the type in which the skirt is connected to the body by a plurality of downwardly and outwardly extending spaced legs, for the reason that all parts of the piston may be symmetrically arranged about the piston axis.

This type of connection is also readily adapted for making the piston so that it can be detached from the connecting rod from the upper side of the piston and then withdrawn through the top of the cylinder. This follows from the fact that the bearing surfaces in a ball-and-socket type connection are localized adjacent the axis of the piston, so that a relatively small open-topped chamber in the center of the piston suffices to contain the ball-head of the connecting rod and the upper and lower bearing blocks or elements therefor.

An approved embodiment of the invention is shown, by way of example, in the accompanying drawings, wherein.

Figure 1:
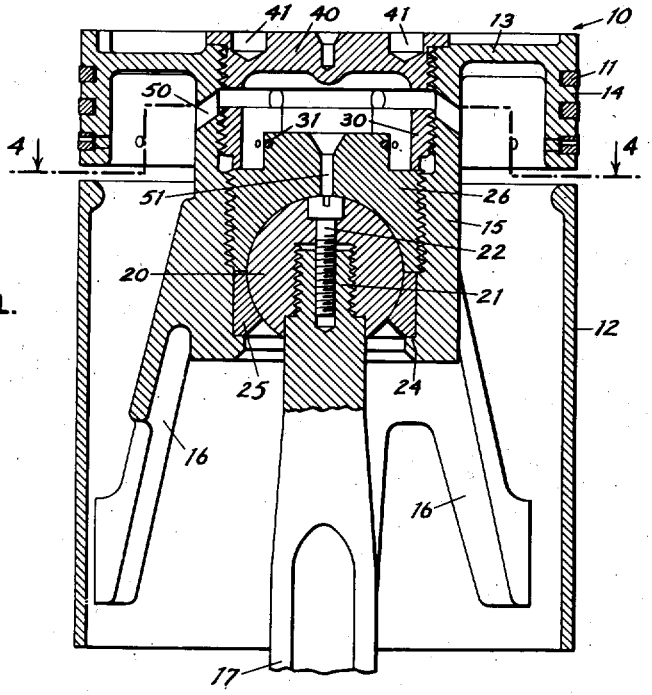
Fig. 1 is a longitudinal, axial section through the piston and the upper part of the connecting rod, on the line 1—1 of Fig. 2.
Figure 2:
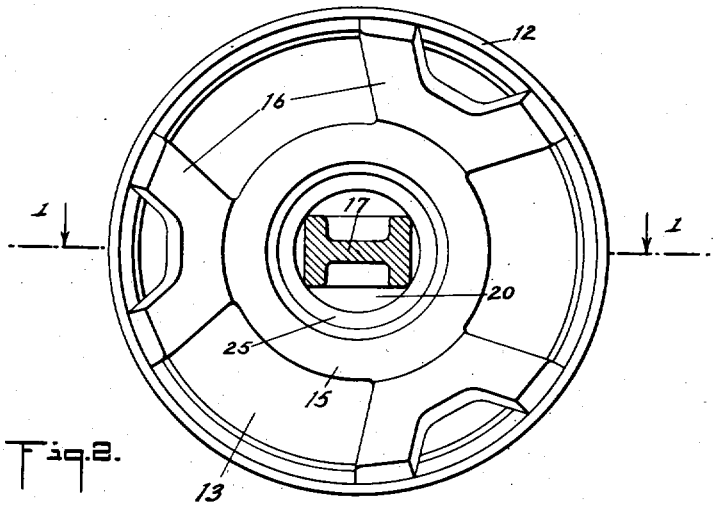
Fig. 2 is a bottom plan view of the piston, the connecting rod being shown in section.

The piston comprises two main parts, a head portion generally designated as 10, which carries the usual rings 11, and a skirt portion 12, which, as shown, is peripherally continuous. The head portion is formed of an annular top part 13, a ring-supporting part or wall 14 extending from the outer periphery thereof, and a central body portion 15 extending from the inner periphery of such top part. Extending from the body portion 15 are a plurality of symmetrically arranged downwardly and outwardly extending forked legs 16 merged at their lower ends with the lower half of the skirt portion. As the legs 16 form the only connection between the body and skirt portions, any heat transferred by conduction from the top of the piston to the skirt has to flow through the tubular body part 15 and the legs 16. The latter are exposed on all sides to the cooling action of the oil splashed up from the crankcase and of the air in the latter and the lower part of the cylinder. The combination of long paths of relatively small cross-section for heat flow, comparatively large area for the dissipation of heat as it flows along such paths, and the opportunity for flow of heat from the skirt to the cylinder walls, results in restricting the rise in temperature of the skirt portion to such an extent that it is not ordinarily necessary to slit the skirt or provide other similar means for allowing for differential expansion between the skirt and the cylinder. Preferably the piston skirt is formed slightly conical, with the larger end next to the piston head. The purpose of this will hereinafter appear.

The connection between the piston and its connecting rod 17 is of the ball-and-socket type to allow the piston to turn about the end of the connecting rod. The connecting rod is provided with a ball-head 20, formed with a diametrical passage therethrough, threaded in its lower part for engagement with a threaded stud 21 on the upper end of the connecting rod. The ball-head is locked in position by a screw 22 extending through the upper part of such passage and having threaded engagement with an internally threaded recess in the end of the stud 21. The external and internal threads on the stud 21 are made right-hand and left-hand, respectively, so that any tendency of the ball to unscrew from the end of the stud 21 tends to tighten the grip of the locking screw 22.

The ball-head 20 is located within a chamber consisting of the bore of the tubular body part 15. At the lower end of this chamber is a bearing element 25, to advantage formed separately from the body part 15 and supported by an inwardly extending shoulder 24. The wall of the chamber above the bearing element 25 is threaded for engagement with an upper bearing element 26. The piston, as will be shown later, is constructed so that it turns in a clockwise direction, so that, if the threads on the upper bearing element are left-hand, the rotation of the piston will tend to keep the upper bearing element tightly its home position. The bore of the tubular body part 15 is widened above the threaded part which engages the upper bearing element and is formed with right-hand threads. A right-hand-threaded lock nut 30 is engaged with the threaded upper part of the chamber. Due to the friction between the upper bearing element and the lock nut, these parts tend to turn as a unit, and, in so far as they do so turn, the turning movement tightens the engagement of one or the other of these parts with their respective threads on the chamber wall. As, however, vibration may tend to loosen the lock nut, a spring 31 is provided, connected at one end to the upper bearing element and at the other to the lock nut and tensioned so that the spring tends to turn these two parts in opposite directions. The result of this construction is that, as one part has a right-hand and the other a left-hand thread, each part tends to be moved by the spring in a direction either away from or toward the other, so as to loosen or tighten the lock nut. The parts must be so connected that the parts tend to tighten, i. e., they must be moved by the spring toward each other so as to increase the friction between the two parts.

Figure 4:
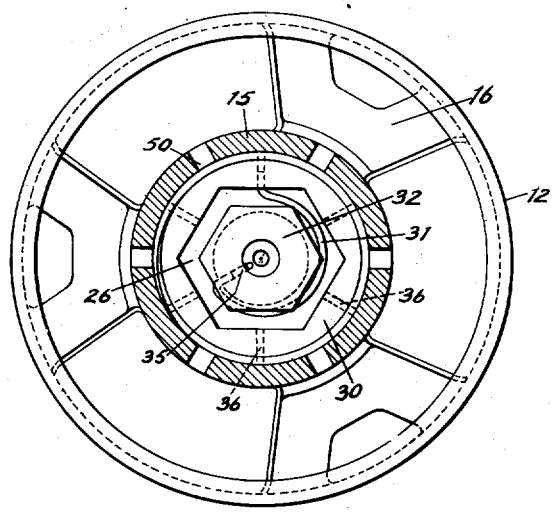
Fig. 4 is a section on the line 4—4 of Fig. 1.
Figure 5:
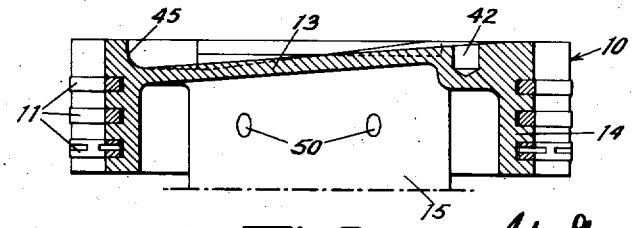
Fig. 5 is a section of the upper part of the piston on the line 5—5 of Fig. 3.

The upper bearing element is formed with an upstanding hexagonal boss 32 to enable such element to be engaged by a socket wrench. The lock nut is made hollow and is formed with a hexagonal inner face so as to be engaged by a socket wrench. In the annular space between the outer face of the boss 32 and the inner face of the lock nut is arranged the spring 31. One end of this spring is bent inwardly for insertion into a radial hole 35 in the boss 32. The other end of this spring is bent outwardly for insertion into one or other of a series of radial holes 36 in the lock nut. In assembling the piston, the bearing element 26 is screwed down to its desired position, then the lock nut is screwed down until it engages the bearing element, next the inwardly extending end of the spring 31 is slipped into the hole 35, and finally the other end is pulled around anti-clockwise until it is brought opposite and allowed to slip into one of the holes 36 under tension. The spring is then under tension, so that it tends to turn the lock nut in a clockwise direction and the upper bearing element in an anti-clockwise direction, thereby firmly holding such parts in locked relation. Advantageously, the boss 32 is grooved circumferentially, as shown in Figs. 1 and 4, to hold it in position and to allow greater space for the spring 31.

After the lock nut has been adjusted and the spring inserted, the top of the chamber is closed by a threaded cap 40. This cap is formed with two recesses 41 for engagement by a key. Since the piston is free to turn about the connecting rod, means should be provided for holding the piston so that it cannot turn while the upper bearing element, lock nut and cap are being screwed up or unscrewed. The means shown comprise three recesses 42 in the top part 13 of the piston adapted to be engaged by three pins on a ring formed with a laterally extending handle.

The ball-and-socket joint is lubricated by oil splashed up from the crank-case. For this purpose a series of holes 50 are drilled through the tubular part 15 to permit oil to pass into the central chamber within said part. The passage of oil therethrough is aided by making these holes inclined upwardly, as shown. These holes are above the top of the boss 32, so that oil entering through such holes collects around this boss and finally runs over its top and down an oil passage 51 axially formed therein.

The upper surface of the top part 13 of the piston is formed with three recesses 45, the bottoms of which slope downwardly in directions transverse with respect to the radii of the piston. Looking at the top of the piston, the direction of downward slope is clockwise. Intermediate each of these sloping surfaces are surfaces lying in radial planes.

Figure 3:
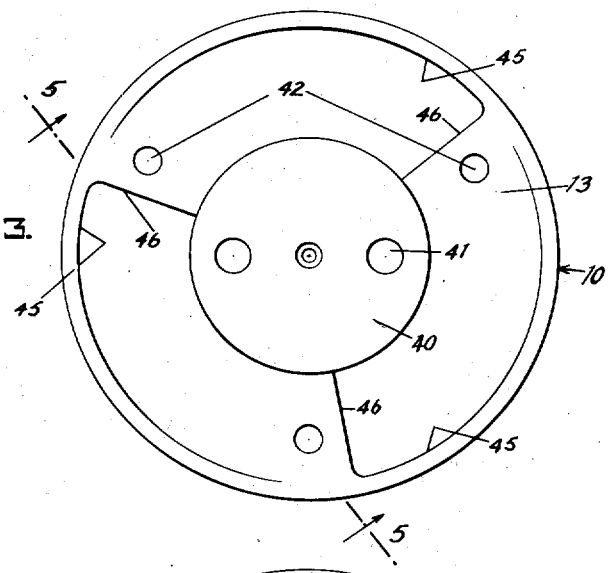
Fig. 3 is a top plan view of the piston.

It has been found that a piston constructed, and associated with a connecting rod, as above described, rotates intermittently through angles of a varying number of degrees. In the normal operation of the engine, it has been observed that this rotation is in a clockwise direction as the piston is viewed from the top as in Fig. 3. By reason of the use of this construction, exceptional uniformity of wear of the cylinder walls is obtained, and the scoring, or grooving, which results from constant travel of a piston held rotatively or allowed to turn only in predetermined angles, is prevented. Caliper tests of the cylinder walls of an engine equipped with the present arrangement, made after the engine has driven a car a great many thousand miles, show a maintained truly cylindrical bore. The cause of the intermittent rotation of the piston through angles of varying degree is believed to be due to forces developed on the power cycle of the engine acting upon the upper surface of the piston. It is believed that the initial impact of the explosive wave against the vertical wall rising from the base of whichever one of the recesses 45 rests in appropriate position causes a movement of the piston about its axis and that this movement is irregular owing to variations in the explosive forces and varying angular positions of the vertical faces of the piston head when the forces are applied. Whatever the correct theory may be in regard to this, the fact is that the piston rotates, and that all of the pistons so constructed and arranged in the cylinders of an engine rotate in the same direction in the normal operation of the engine.

A piston constructed as above described may be inserted in or removed from its cylinder from the upper side of the latter. To remove the piston, the cap 40 is unscrewed, spring 31 detached and lock nut 30 and upper bearing element 26 unscrewed. The locking screw 22 is also removed. The piston is then pushed down in the cylinder until the ball-head 20 of the connecting rod extends well above the top of the piston so that it may be gripped by a suitable tool and unscrewed from the end of the connecting rod. The piston may then be lifted out of the cylinder. The piston may be reinserted by reversing the above operations.

The universal mounting of the piston on the connecting rod allows for the wear-equalizing rotary movement of the piston, as well as permitting the relative angular movement of the piston and connecting rod. Such a mounting may be most effectively employed in piston assemblies where the piston is provided with a substantial skirt which avoids tilting of the head and injury to the parts. In the present case the piston construction is particularly adapted to the employment of a universal mounting of ball type inasmuch as the separate skirt portion of the piston has an upper region that is substantially segregated or isolated from the combustion heats. By reason of this, the upper part of the slightly tapered skirt may be machined nearly to the size of the cylinder bore and will act as a guide under all conditions and temperatures, preventing the head of the piston from tilting or tipping in its travel in the cylinder. When the engine temperatures are raised, as by continued operation, the slight amount of heat transferred through the legs of the piston body to the lower region of the skirt expands that portion of the skirt to substantially the same diameter as the upper, cooler, portion, and supplements the guiding action of the upper portion. Thus a highly desirable operating condition is established. The piston is reciprocated by an operating connection directed at a single central point. The major portion of the piston wall, that is, the skirt, has a restricted range of expansion and contraction due to its isolation from the influence of the higher temperatures. Such temperatures as are effective on the skirt assist the guiding function thereof. The piston is allowed to rotate and the driving force is applied centrally within. The guiding is done exteriorly over a substantial area extending ahead of, and to the rear of, the point of application of the driving force. Under the temperature range of ordinary engine operation the piston does not bind or slap, the guiding is of a character which prevents tilting of the piston and consequent scoring of the cylinder, and the variable rotative movements of the piston keep the wear uniform on both the piston and the cylinder.

It is to be noted that the compression head of the piston may be varied without altering the association of the connecting rod with the crank shaft, which is not possible in conventional present day construction. To vary the compression head, the cap, upper bearing block, the ball head of the connecting rod and the lower bearing block are removed in the manner previously herein described. If it is desired to decrease the compression head, shims are inserted below the lower bearing block. If the compression head is to be increased, this can be done by reducing the thickness of the lower bearing block before restoring it to position.

The piston and connecting rod construction above described markedly increases the efficiency of an internal combustion engine in which it is employed. Exceptional economies in liquid fuel and in lubricating oil are obtained. The life of the engine is extended due to the even distribution of wear on the cylinder walls. During the life of the engine, better attention may be given to its working organization due to the ease of access to the piston for replacement of rings and adjustment of the connecting rod upper bearings.

What is claimed is:

1. The combination of a piston and a connecting rod, the piston comprising a ring-carrying head, a central substantially continuous tubular part depending therefrom and open at the top, a removable cap for the top of said tubular part, a skirt portion below and spaced away from the said ring-carrying head, and a plurality of downwardly and outwardly extending spaced legs united at their upper ends with said tubular part and at their lower ends with the lower half of said skirt portion, the connecting rod comprising a spherical head disposed within the bore of said tubular part, and the piston also including upper and lower bearing elements for said spherical head carried by said tubular part, the upper bearing element being removable from the top side of the piston.

2. In a reciprocating piston engine, the combination of a piston, a connecting rod, and means connecting the rod and piston adapted to permit rotative movement of the piston, said piston having means on the head abetting variable rotation thereof in one direction under working conditions.

3. The combination of a piston, a connecting rod, and means connecting the rod and piston adapted to permit rotative movement of the piston, the top of said piston being formed with angularly spaced surfaces lying in substantially radial planes adapted to be acted upon under working conditions to cause rotation of the piston.

4. The combination of a piston and a connecting rod, the piston comprising a ring-carrying head, a central substantially continuous tubular part depending from said head and open at the top, means closing the open top of said tubular part, a skirt portion below and spaced from said ring-carrying head, and a plurality of spaced legs extending from the lower end of said tubular part and having union with the skirt at the lower portion of said skirt, the connecting rod comprising a spherical head disposed within the bore of said tubular part.

5. The combination of a piston and a connecting rod, the piston comprising a ring-carrying head, a central substantially continuous tubular part depending from said head, a skirt below and spaced from said head, and spaced means extending from the lower end of said tubular part and having union with the lower portion of said skirt, the connecting rod comprising a spherical head disposed within the bore of said tubular part.

6. The combination of a piston and a connecting rod, the piston comprising a ring-carrying head, a central substantially continuous tubular part depending from said head, a skirt below and spaced from said head, spaced means extending from the lower end of said tubular part and having union with the lower portion of said skirt, the connecting rod comprising a spherical head disposed within the bore of said tubular part, and said skirt being of less diameter at the lower portion than at the top.

7. The combination of a piston, a connecting rod, and means connecting the rod and piston adapted to permit rotative movement of the piston, the top of said piston being shaped to provide a plurality of substantially vertical faces spaced angularly around the piston axis and a plurality of top surfaces which extend respectively between successive vertical faces and each of which inclines from the plane of the top of one of said faces toward the base of the next.

8. The combination of a piston and a connecting rod, the piston comprising a ring-carrying head, a centrally substantially continuous tubular part depending from said head, a removable cap at the top of said tubular part, a skirt below said head and spaced therefrom, spaced means extending from the lower end of said tubular part and having union with the lower portion of said skirt, an upper bearing member removably arranged in said tubular part, and a lower bearing member in said tubular part, the connecting rod comprising a spherical head arranged between said bearing members.

9. The combination of a piston and a connecting rod, the piston comprising a ring-carrying head, a central substantially continuous tubular part depending from said head, a skirt below and spaced from said head, and spaced means extending downwardly from said tubular part and having union with the lower portion of said skirt, the connecting rod comprising a spherical head disposed within the bore of said tubular part, a lower annular bearing within said tubular part surrounding the upper end of the connecting rod and bearing against the under side of said spherical head and an upper bearing within said tubular part bearing against the upper part of said spherical head.

10. The combination of a piston and a connecting rod, the connecting rod having a spherical head at its upper end, the piston comprising a head portion having a top part and a ring-carrying part and a central downwardly extending tubular bearing-carrying part provided with bearings for the spherical head of the connecting rod, and a skirt portion spaced from the ring-carrying part and from the bearing-carrying part of the head portion, and three or more symmetrically arranged struts connecting the skirt portion to one of said parts of the head portion.

11. The combination of a piston and a connecting rod, comprising a ball-and-socket connection between the piston and the connecting rod, the ball having a diametrical passage therethrough comprising a main threaded portion and an upper portion of less diameter than the main portion countersunk at the top, the upper end of the connecting rod being threaded and screwed home into said passage and having a threaded bore therein, and a headed locking screw extending through the upper part of said passage and screwed into the threaded bore in the end of the connecting rod to seat its head against the ball, one of the threads of the end of the connecting rod being right-hand and the other left-hand.

JOHN SHEARMAN DONALDSON.